(12) United States Patent
Kim et al.

(10) Patent No.: US 9,811,247 B2
(45) Date of Patent: Nov. 7, 2017

(54) IN-VEHICLE INFOTAINMENT DEVICE AND IMAGE DISPLAY METHOD USING THE SAME

(71) Applicant: LG ELECTRONICS INC., Seoul (KR)

(72) Inventors: Joonhyung Kim, Seoul (KR); Hyungjin Jeon, Seoul (KR); Jongseon Park, Seoul (KR); Chunsung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 14/089,220

(22) Filed: Nov. 25, 2013

(65) Prior Publication Data

US 2015/0149918 A1    May 28, 2015

(51) Int. Cl.
| | |
|---|---|
| *G06F 3/0484* | (2013.01) |
| *G07C 5/00* | (2006.01) |
| *H04L 29/08* | (2006.01) |
| *B60K 35/00* | (2006.01) |
| *G06F 3/0482* | (2013.01) |

(52) U.S. Cl.
CPC .......... *G06F 3/04842* (2013.01); *B60K 35/00* (2013.01); *G07C 5/00* (2013.01); *H04L 67/02* (2013.01); *B60K 2350/1096* (2013.01); *G06F 3/0482* (2013.01)

(58) Field of Classification Search
CPC ............ B60K 35/00; B60K 2350/1096; G06F 3/04842; G07C 5/00; H04L 67/02
See application file for complete search history.

(56) References Cited

U.S. PATENT DOCUMENTS

| 6,526,335 B1 * | 2/2003 | Treyz | ............... | G01C 21/26 |
| | | | | 307/10.1 |
| 8,140,358 B1 * | 3/2012 | Ling | ............... | G06Q 40/08 |
| | | | | 340/439 |

(Continued)

OTHER PUBLICATIONS

McCormack, "Web IDL W3C Candidate Recommendation", Apr. 19, 2012, W3C, accessed on Aug. 17, 2016, accessed from <https://www.w3.org/TR/WebIDL/>, 1-113.*

(Continued)

*Primary Examiner* — Nicholas Klicos
(74) *Attorney, Agent, or Firm* — Birch, Stewart, Kolasch & Birch, LLP

(57) ABSTRACT

A method of controlling an infotainment device including displaying a web browser page corresponding to an executing web application; determining if a first characteristic value corresponding to a first image of the vehicle to be displayed is included in received vehicle data; displaying the first image of the vehicle on the web browser page if the first characteristic value is included in the received vehicle data; determining if a second characteristic value of the vehicle is included in the received vehicle data when the first characteristic value is not included; estimating the first characteristic value of the vehicle using the second characteristic value if the first characteristic value is not included and the second characteristic value is included; and displaying a second image of the vehicle on the web browser page corresponding to the estimated first characteristic value.

10 Claims, 11 Drawing Sheets

(56) References Cited

U.S. PATENT DOCUMENTS

| | | | | |
|---|---|---|---|---|
| 8,370,030 | B1* | 2/2013 | Gurin | B60R 1/00 180/272 |
| 8,731,977 | B1* | 5/2014 | Hardin | G06Q 40/08 701/482 |
| 2004/0178896 | A1* | 9/2004 | Miller | B60R 16/023 340/441 |
| 2005/0156706 | A1* | 7/2005 | Dawson | B60R 25/04 340/5.72 |
| 2005/0267657 | A1* | 12/2005 | Devdhar | G06K 9/00208 701/33.4 |
| 2007/0050240 | A1* | 3/2007 | Belani | G08G 1/14 705/13 |
| 2007/0063538 | A1* | 3/2007 | Menke | B60J 5/0479 296/146.9 |
| 2007/0073908 | A1* | 3/2007 | Gormley | G05B 19/0421 710/8 |
| 2007/0142977 | A1* | 6/2007 | Munoz | B60Q 1/22 701/1 |
| 2007/0282713 | A1* | 12/2007 | Ullman | G06Q 10/087 705/26.1 |
| 2008/0186206 | A1* | 8/2008 | Reumerman | G08G 1/161 340/902 |
| 2008/0301587 | A1* | 12/2008 | Baumann | B60K 35/00 715/841 |
| 2009/0018709 | A1* | 1/2009 | Hellwig | B60K 35/00 701/1 |
| 2009/0157254 | A1* | 6/2009 | Nishida | B60K 35/00 701/36 |
| 2009/0204290 | A1 | 8/2009 | Okamoto | |
| 2009/0207005 | A1* | 8/2009 | Habetha | G08G 1/162 340/435 |
| 2009/0256813 | A1 | 10/2009 | Amici et al. | |
| 2009/0326758 | A1* | 12/2009 | Ramanathan | G06Q 10/087 701/31.4 |
| 2010/0204869 | A1* | 8/2010 | Hall | B60C 23/061 701/31.4 |
| 2010/0214130 | A1 | 8/2010 | Weinmann et al. | |
| 2011/0057782 | A1* | 3/2011 | Chundrlik, Jr. | B60R 1/00 340/436 |
| 2011/0106374 | A1* | 5/2011 | Margol | G06F 8/61 701/31.4 |
| 2011/0225047 | A1* | 9/2011 | Breed | G06Q 30/02 705/14.55 |
| 2011/0309924 | A1 | 12/2011 | Dybalski et al. | |
| 2012/0130604 | A1* | 5/2012 | Kirshon | F02N 11/0822 701/51 |
| 2012/0169489 | A1* | 7/2012 | Gocho | B60K 37/02 340/449 |
| 2012/0179325 | A1* | 7/2012 | Faenger | B60K 35/00 701/31.4 |
| 2012/0297337 | A1* | 11/2012 | St. Denis | G08G 1/168 715/810 |
| 2012/0303203 | A1* | 11/2012 | Olsen | G08G 1/0133 701/29.1 |
| 2013/0073121 | A1* | 3/2013 | Kim | B60R 25/209 701/2 |
| 2013/0085638 | A1 | 4/2013 | Weinmann et al. | |
| 2013/0097410 | A1* | 4/2013 | Bourges-Sevenier | G06F 17/30899 712/220 |
| 2013/0191442 | A1* | 7/2013 | Bourges-Sevenier | G06F 9/45512 709/203 |
| 2013/0198325 | A1* | 8/2013 | Bourges-Sevenier | G06F 9/5016 709/217 |
| 2013/0207794 | A1* | 8/2013 | Patel | B60K 35/00 340/425.5 |
| 2013/0275004 | A1* | 10/2013 | Tsimhoni | B60R 16/02 701/45 |
| 2014/0062688 | A1* | 3/2014 | Aoki | B60K 37/02 340/441 |
| 2014/0066132 | A1* | 3/2014 | Burke | H04L 67/12 455/569.2 |
| 2014/0114532 | A1* | 4/2014 | Choi | G08G 1/167 701/36 |
| 2014/0229580 | A1* | 8/2014 | Yamagishi | G06Q 30/02 709/219 |
| 2014/0277904 | A1* | 9/2014 | Schankula | G01M 15/10 701/29.2 |
| 2015/0088337 | A1* | 3/2015 | Toohy | B60R 16/037 701/1 |
| 2015/0127210 | A1* | 5/2015 | Suzuki | G01C 21/3688 701/29.1 |
| 2015/0232065 | A1* | 8/2015 | Ricci | B60R 25/01 701/36 |

OTHER PUBLICATIONS

Written Opinion of the International Searching Authority and International Search Report (forms PCT/ISA/237, PCT/ISA/210 and PCT/ISA/220), issued Jun. 5, 2015, for International Application No. PCT/IB2014/003045.

* cited by examiner

FIG. 5

```
var TRANSMISSION_GEAR_TYPE_AUTO = 1;     ⎫ Define constants for transmissionGearType
var TRANSMISSION_GEAR_TYPE_MANUAL = 2;   ⎭ vehicle.get("vehicle_info_transmission_gear_type", handleVehicleData(data), handleError(error))  ⎫
function handleVehicleData(data) {                                                                │
  if (data.transmissionGearType == TRANSMISSION_GEAR_TYPE_AUTO) {                                 │  Get a transmission gear type from
    console.log("Automatic transmission equipped");                                               │
  } else if (data.transmissionGearType == TRANSMISSION_GEAR_TYPE_MANUAL) {                        │
    console.log("Manual transmission equipped");                                                  │
  }                                                                                               ⎭
}
```

FIG. 6

```
var TIRE_PRESSURE_STATUS_NORMAL = 0;
var TIRE_PRESSURE_STATUS_LOW = 1;      } Define constants for tirePressureStatus
var TIRE_PRESSURE_STATUS_HIGH = 2;

vehicle.get("maintenance_tire_pressure_status", handleVehicleData(data), handleError(error))  ⎫
function handleVehicleData(data) {                                                            ⎪
  if ((data.tirePressureStatusFrontLeft != 0) || (data.tirePressureStatusFromRight != 0) ||   ⎬ Get tire pressure status information from MaintenanceEvent
(data.tirePressureStatusRearLeft != 0) || (data.tirePressureStatusRearRight != 0)) {          ⎪
    console.log("Check your tire pressure!");                                                 ⎭
  }
}
```

FIG. 7

```
var DRIVING_MODE_COMFORT = 1;  ⎫
var DRIVING_MODE_AUTO = 2;     ⎬ Define constants for drivingMode
var DRIVING_MODE_SPORT = 3;    ⎪
var DRIVING_MODE_ECO = 4;      ⎪
var DRIVING_MODE_MANUAL = 5;   ⎭ data = new Object();
data.drivingMode = DRIVING_MODE_SPORT;
vehicle.set("personalization_driving_mode", data, handleSuccess, handleError(error));  ⎫
function handleSuccess() {                                                              ⎬ Monitor door open status from DrivingSafetyEvent
    console.log("Setting driving mode command is successfully sent to the vehicle bus."); ⎪
}                                                                                        ⎭
```

FIG. 8

```
vehicle.addEventListener("driving_safety_door_open_status", handleVehicleData(data), false); } Monitor door open status from DrivingSafetyEvent function handleVehicleData(data) {
  if (data.type == "driving_safety_door_open_status_driver") {
    if (data.doorOpenStatusDriver) {
      console.log("The driver door is opened.");
    } else {
      console.log("The driver door is closed.");
    }
  } else if (data.type == "driving_safety_door_open_status_passenger") {
```

⎫
⎬ This function is called when any of door open status is changed
⎭

FIG. 10

```
var VEHICLE_TYPE_SEDAN = 1;
var VEHICLE_TYPE_COUPE = 2;
var VEHICLE_TYPE_CABRIOLET = 3;         ⎫
var VEHICLE_TYPE_ROADSTER = 4;          ⎬ Define constants for vehicleType
var VEHICLE_TYPE_SUV = 5;               ⎭
var VEHICLE_TYPE_TRUCK = 6;

if (vehicle.getSupportedEventTypes("vehicle_info_vehicle_type", false) == "") {     ⎫  If vehicleType API is not supported and
    if (vehicle.getSupportedEventTypes("vehicle_info_door_type", false) == "") {    ⎬  also doorType APIs are not supported,
        document.getElementById("imgVehicle").src = "img/vehicleDefault.jpg";       ⎭  Show the default vehicle image when the
                                                                                       vehicle type is not supported
} else {
    vehicle.get("vehicle_info_door_type", handleDoorType, handleError);
    function handleDoorType(data) {
        // If the vehicle only has doors in 1st row
        if ((data.doorType2ndRow == 0) & (data.doorType3rdRow == 0)) {
            // and the vehicle has convertible roof,
            if (vehicle.getSupportedEventTypes("climate_environment_convertible_roof", false) != "") {   ⎫
                // Guessing the vehicle type as Cabriolet                                                 ⎪
                document.getElementById("imgVehicle").src = "img/vehicleCabriolet.jpg";                   ⎪  Otherwise,
            } else {                                                                                      ⎬  guessing vehicle
                // Otherwise, guessing the vehicle type as Roadster                                       ⎪  Type from the
                document.getElementById("imgVehicle").src = "img/vehicleRoadster.jpg";                    ⎪  related APIs
            }                                                                                             ⎭
        } else {
            // Otherwise, just guessing the vehicle type as Sedan
            document.getElementById("imgVehicle").src = "img/vehicleSedan.jpg";
        }
    }
}

} else {
vehicle.get("vehicle_info_vehicle_type", handleVehicleType, handleError);
    function handleVehicleType(data) {
        if (data.vehicleType == 1) {
            document.getElementById("imgVehicle").src = "img/vehicleSedan.jpg";
        } else if (data.vehicleType == 2) {
            document.getElementById("imgVehicle").src = "img/vehicleCoupe.jpg";
        } else if (data.vehicleType == 3) {                                         ⎫
            document.getElementById("imgVehicle").src = "img/vehicleCabriolet.jpg"; ⎪
        } else if (data.vehicleType == 4) {                                         ⎪  Show the precise
            document.getElementById("imgVehicle").src = "img/vehicleRoadster.jpg";  ⎬  vehicle image
        } else if (data.vehicleType == 5) {                                         ⎪  obtained from
            document.getElementById("imgVehicle").src = "img/vehicleSUV.jpg";       ⎪  the API
        } else if (data.vehicleType == 6) {                                         ⎭
            document.getElementById("imgVehicle").src = "img/vehicleTruck.jpg";
        } else {
            document.getElementById("imgVehicle").src = "img/vehicleDefault.jpg";
        }
    }
}
```

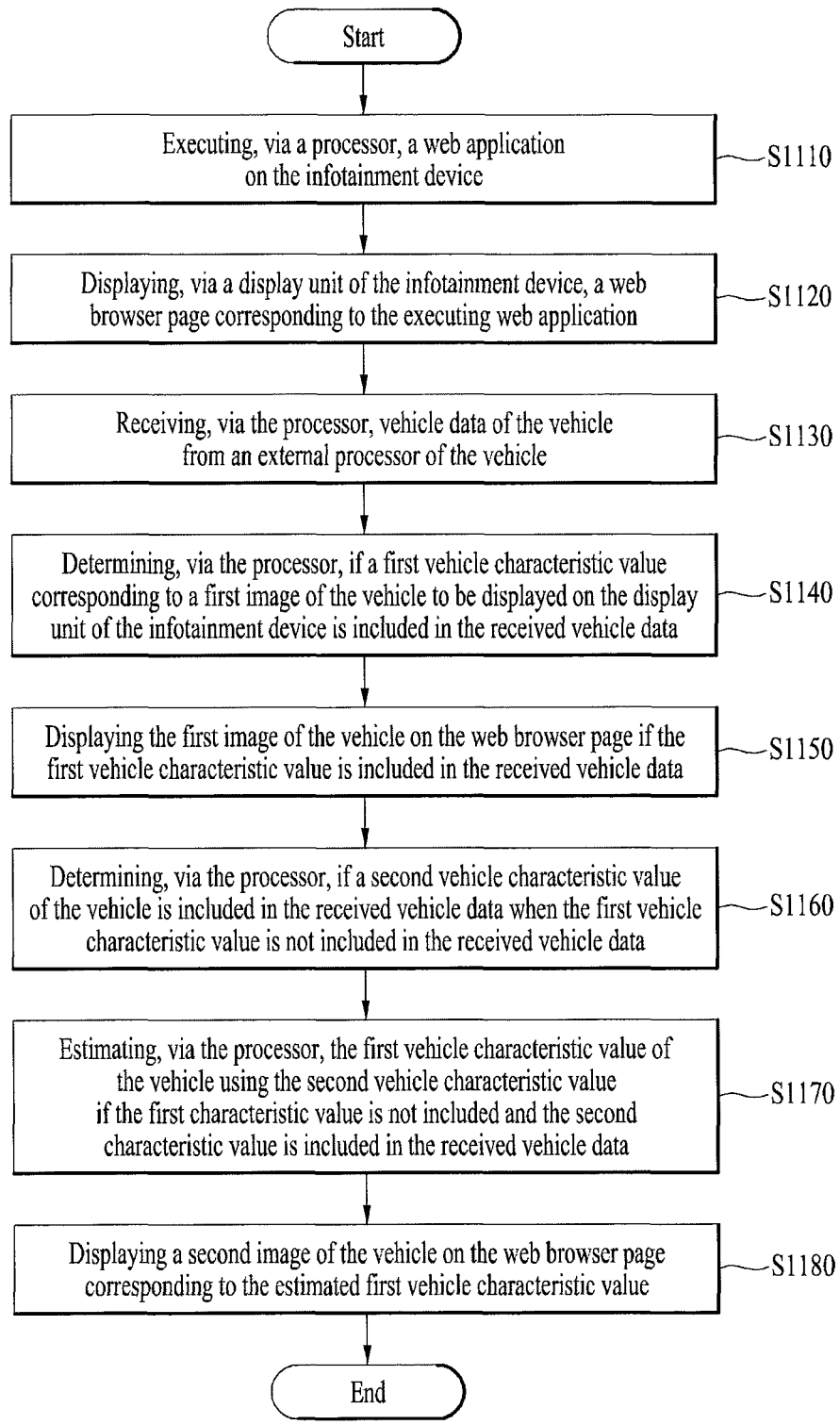

IN-VEHICLE INFOTAINMENT DEVICE AND IMAGE DISPLAY METHOD USING THE SAME

BACKGROUND OF THE INVENTION

Field of the Invention

The present invention relates to an image display method using an in-vehicle infotainment device mounted in a vehicle and more particularly, to an in-vehicle infotainment device configured to efficiently display status information of the vehicle and an image display method using the same.

Discussion of the Related Art

An in-vehicle infotainment device provides a user with a vehicle information display function, a navigation function or a TV output function through an image display device mounted in a vehicle. Recently, it is possible to execute a web application through an in-vehicle infotainment device mounted in a vehicle.

A web application executed by an in-vehicle infotainment device mounted in a vehicle requires an image display method for outputting a suitable visual image on an image display device mounted in a vehicle via information related to the vehicle.

SUMMARY OF THE INVENTION

Accordingly, the present invention is directed to an in-vehicle infotainment device and an image display method using the same that substantially obviate one or more problems due to limitations and disadvantages of the related art.

An object of the present invention is to provide an in-vehicle infotainment device configured to efficiently display status information of a vehicle in execution of a web application using the in-vehicle infotainment device mounted in the vehicle and an image display method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-vehicle infotainment device includes a first processor for executing a web application and a second processor for outputting vehicle data to the first processor. The first processor includes a first-processor-side inter-node communication (INC) interface module for transmitting and receiving information to and from the second processor. The second processor includes a second-processor-side INC interface module for transmitting and receiving information to and from the first processor. The first processor determines a first characteristic value set as a first variable corresponding to a first visual element included in an image output from an external image device through the vehicle data received from the second processor and including a characteristic value of a vehicle, sets the determined first characteristic value as the first variable, changes the first visual element according to the characteristic value set as the first variable, and outputs an image including the changed first visual element on the external image device.

If the first characteristic value is not determined through the vehicle data, the first processor may determine a second characteristic value set as a second variable corresponding to a second visual element related to the first visual element, and determine the first characteristic value through the second characteristic value.

If the second characteristic value is not determined, the first processor may change the first visual element to a default visual element and output an image including the changed first visual element on the external image device.

The vehicle data may further include a third characteristic value related to an external device mounted in the vehicle, and the first processor may generate a third variable for setting the third characteristic value and receive a third visual element related to the third variable from the external device.

The first processor may determine the third characteristic value through the vehicle data, set the third characteristic value in the third variable, change the third visual element according to the characteristic value set as the third variable and output an image including the changed third visual element on the external image device.

The first processor may request the vehicle data including the first characteristic value from the second processor.

The first processor may request the vehicle data including the second characteristic value from the second processor.

In another aspect of the present invention, an image display method includes receiving vehicle data including a characteristic value of a vehicle from an external processor, determining, through the received vehicle data, a first characteristic value set as a first variable corresponding to a first visual element included in an image output from an external image device, setting the determined first characteristic value as the first variable, and changing the first visual element according to the characteristic value set as the first variable and outputting an image including the changed first visual element on the external image device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram showing an example of a message for requesting vehicle data according to an embodiment of the present invention;

FIG. 6 is a diagram showing another example of a message for requesting vehicle data according to an embodiment of the present invention;

FIG. 7 is a diagram showing an example of a message for controlling a vehicle according to an embodiment of the present invention;

FIG. 8 is a diagram showing an example of an EventHandler for monitoring vehicle data according to an embodiment of the present invention;

FIG. 10 is a diagram showing an example of application code for changing a visual element of a web application according to an embodiment of the present invention; and FIG. 11 is a flowchart of the method of the invention.

DETAILED DESCRIPTION OF THE INVENTION

Hereinafter, a mobile terminal according to the present invention will be described in greater detail with reference to the drawings. The suffixes "module" and "unit" of the components used in the following description are used interchangeably for convenience of explanation and are not distinguished from each other in terms of meaning or role.

Figure 1:
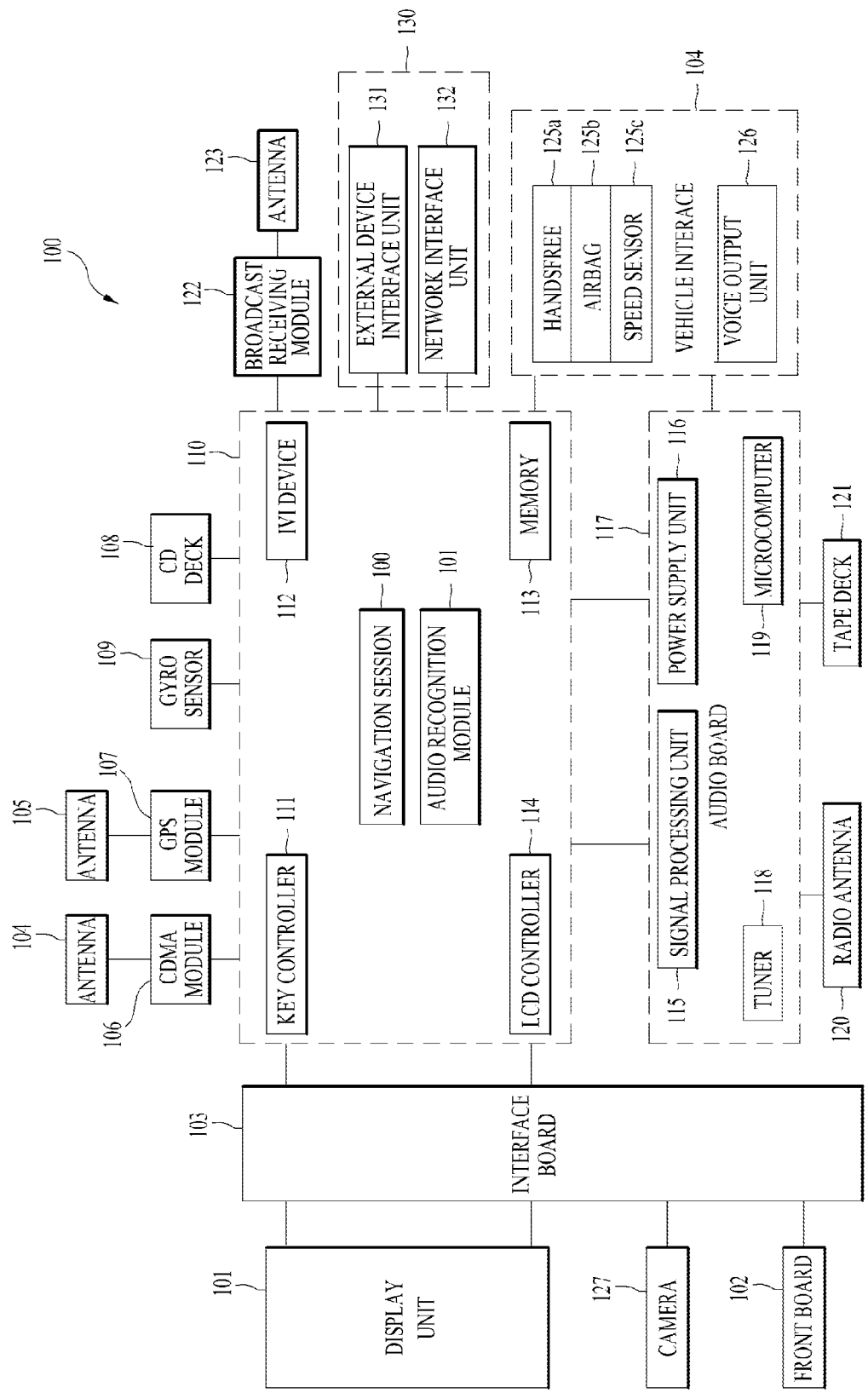
FIG. 1 is a schematic block diagram showing the configuration of an in-vehicle infotainment (IVI) system including an in-vehicle infotainment device according to an embodiment of the present invention.

FIG. 1 is a block diagram illustrating a configuration of an IVI system 100 according to an embodiment of the present invention. As shown in FIG. 1, the IVI system 100 includes a main board 110 including an in-vehicle infotainment device 112 configured to control an overall operation of the IVI system 100 (e.g., a central processing unit: CPU), a memory 113 configured to store therein programs for processing the in-vehicle infotainment device 112 and input/output data, a key controller 111 configured to control each kind of key signals, and an LCD controller 114 configured to control a liquid crystal display (LCD).

The memory 113 may store therein map information (map data) for displaying road guidance information on a digital map. Also, the memory 113 may store therein a traffic information collection control algorithm for inputting traffic information according to a road condition in which a vehicle is currently traveling, and information for controlling the algorithm.

The main board 110 may also include a CDMA (code division multiple access) module 106 provided with a unique device number and mounted in a vehicle, a GPS module 107 configured to receive a GPS signal for guiding a position of a vehicle and tracking a travel path from a starting point to a destination point or to transmit traffic information collected by a user in the form of a global positioning system (GPS) signal, a CD deck 108 configured to play a signal recorded in a compact disk (CD), a gyro sensor 109, etc. The CDMA module 106 and the GPS module 107 may transmit or receive signals through antennas 104 and 105.

A broadcast signal receiving module 122 may be connected to the main board 110, and may receive a broadcast signal through an antenna 123. The main board 110 also include a display unit (LCD) 101 controlled by the LCD controller 114 through an interface board 103, a front board 102 controlled by the key controller 111, and a camera 127 configured to capture inside and/or outside of a vehicle. The display unit 101 is configured to display each kind of video signals and text signals. The front board 102 includes buttons for inputting each kind of key signals, and supplies a key signal corresponding to a button selected by a user to the main board 110. In addition, the display unit 101 includes the proximity sensor and the touch sensor (touch screen) of FIG. 2.

The front board 102 may include a menu key for directly inputting traffic information, and the menu key may be configured to be controlled by the key controller 111.

The audio board 117 is connected to the main board 110, and processes each kind of audio signals. The audio board 117 includes a micro computer 119 configured to control the audio board 117, a tuner 118 configured to receive a radio signal, a power unit 116 configured to supply power to the micro computer 119, and a signal processor 115 configured to process each kind of audio signals.

The audio board 117 includes a radio antenna 120 configured to receive a radio signal, and a tape deck 121 configured to play an audio tape. The audio board 117 may further include an audio output unit (e.g., amplifier) 226 configured to output an audio signal processed by the audio board 117.

The audio output unit (amplifier) 226 is connected to a vehicle interface 124. That is, the audio board 117 and the main board 110 are connected to the vehicle interface 124. The vehicle interface 124 may be connected to a hands-free unit 125a for inputting an audio signal, an air bag 125b for a passenger's safety, a speed sensor 125c for detecting a vehicle speed, etc. The speed sensor 125c is configured to calculate a vehicle speed and to provide information on the calculated vehicle speed to the central processing unit 112.

The navigation session 300 applied to the IVI system 100 is configured to generate road guidance information based on map data and information on a current position of a vehicle, and to provide the generated road guidance information to a user.

The display unit 101 is configured to detect a proximity touch in a display window through a proximity sensor. For instance, when a pointer (e.g., a finger or a stylus pen) executes a proximity touch, the display unit 101 detects a position where the proximity touch has occurred and output position information corresponding to the detected position to the in-vehicle infotainment device 112.

An audio recognition device (or audio recognition module) 301 is configured to recognize an audio signal (voice) generated from a user, and to perform a corresponding function according to the recognized audio signal.

The navigation session 300 applied to the IVI system 100 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 110 may be connected to the interface unit 130, and the interface unit 130 may include an external device interface unit 131 and a network interface unit 132. The external device interface unit 131 may connect an external device to the IVI system 100. For this, the external device interface unit 131 may include an A/V input/output unit or a wireless communication unit.

The external device interface unit 131 may be connected to an external device in a wired or wireless manner, the external device such as a DVD (Digital Versatile Disk), a Blu-ray, a game player, a camera, a camcorder and a notebook computer. The external device interface unit 131 transmits, to the in-vehicle infotainment device 112, a video signal or an audio signal or a data signal input from the outside through the connected external device. Further, the video signal or the audio signal or the data signal processed by the in-vehicle infotainment device 112 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the IVI system 100.

The wireless communication unit may perform a short-range wireless communication with other electronic device. For instance, the IVI system 100 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 131 may be connected to various set-top boxes through one of the aforementioned terminals, thereby performing inputs and outputs with the set-top boxes. The external device interface unit 131 may receive applications inside a neighboring external device or a list of applications, and transmit the received applications or list to the in-vehicle infotainment device 112 or the memory 113.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN)(Wi-Fi), Wibro (Wireless broadband), Wimax (World Interoperability for Microwave Access), and HSDPA (High Speed Downlink Packet Access) for connection with a wireless network.

The network interface unit 132 provides an interface for connecting the IVI system 100 to a wired or wireless network including an internet network. The network interface unit 132 may be provided with an Ethernet terminal for accessing a wired network, and may utilize a communication standard such as WLAN (Wireless LAN)(Wi-Fi), Wibro (Wireless broadband), Wimax (World Interoperability for Microwave Access) and HSDPA (High Speed Downlink Packet Access) for accessing a wireless network.

The network interface unit 132 may transmit or receive data to/from other user or other electronic device, through an accessed network or other network linked to an accessed network. Especially, the network interface unit 132 may transmit some of contents data stored in the IVI system 100, to a user or an electronic device selected from a plurality of users or electronic devices pre-registered in the IVI system 100.

The network interface unit 132 may access a predetermined web page through an accessed network or other network linked to an accessed network. More concretely, the network interface unit 132 may access a predetermined web page through a network thus to perform data transmission or data reception with a corresponding server. Also, the network interface unit 132 may receive contents or data provided from a contents provider or a network operator. More concretely, the network interface unit 132 may receive contents of a film, an advertisement, a game, a VOD, a broadcasting signal, etc. provided from a contents provider or a network provider through a network, and information relating to the contents.

The network interface unit 132 may receive update information and an update file of a firmware provided from a network operator. The network interface unit 132 may transmit data to an internet or contents provider or a network operator. Further, the network interface unit 132 may receive, through a network, a desired application by selecting from applications open to the public.

Figure 2:
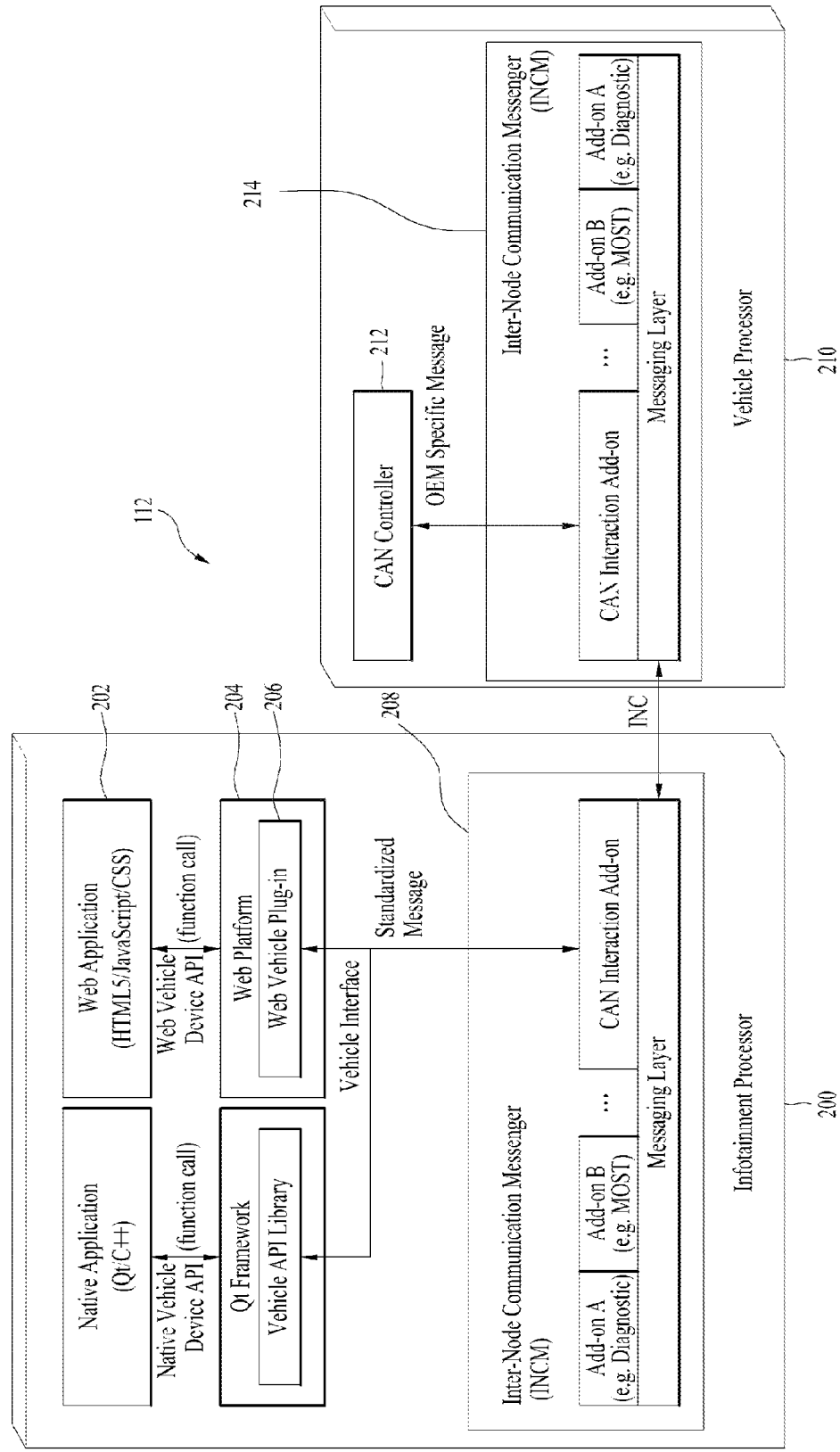
FIG. 2 is a schematic diagram of an in-vehicle infotainment device according to an embodiment of the present invention.

Hereinafter, the in-vehicle infotainment device 112 included in the IVI system and a vehicle data processing method using the same will be described. In particular, FIG. 2 is a schematic diagram of an in-vehicle infotainment device 112 according to an embodiment of the present invention.

As shown, the in-vehicle infotainment device 112 includes a first processor 200 for executing a web application 202 and a second processor 210 for outputting vehicle data to the first processor 200. The first processor 200 may include a first-processor-side inter-node communication (INC) interface module 208 for transmitting and receiving information to and from the second processor 210 and a second-processor-side INC interface module 214 for transmitting and receiving information to and from the first processor.

The first processor 200 and the second processor 210 may be connected via respective INC interface modules 208 and 214. INC is a communication protocol between a vehicle processor and an infotainment processor. In addition, the second processor 210 may receive data related to the status of each part of a vehicle or data sensed by a sensor included in the vehicle from a CAN controller 212. For example, the second processor 210 may receive information about whether or not a vehicle is being driven from the CAN controller 212.

Further, the second processor 210 may receive vehicle data as a message based on the CAN communication standard. The second processor 210 may output the vehicle data received from the CAN controller 212 to the first processor 200 via the INC module 214. In addition, the INC module 214 may include vehicle data in a CAN interaction region of an INC message and output the vehicle data to the first processor 200.

Also, the first processor 200 may receive an INC message including the vehicle data from the second processor 210 via the INC module 208. The first processor 200 may provide the web application 202 with the vehicle data included in the INC message via the web application platform 204.

Figure 3:
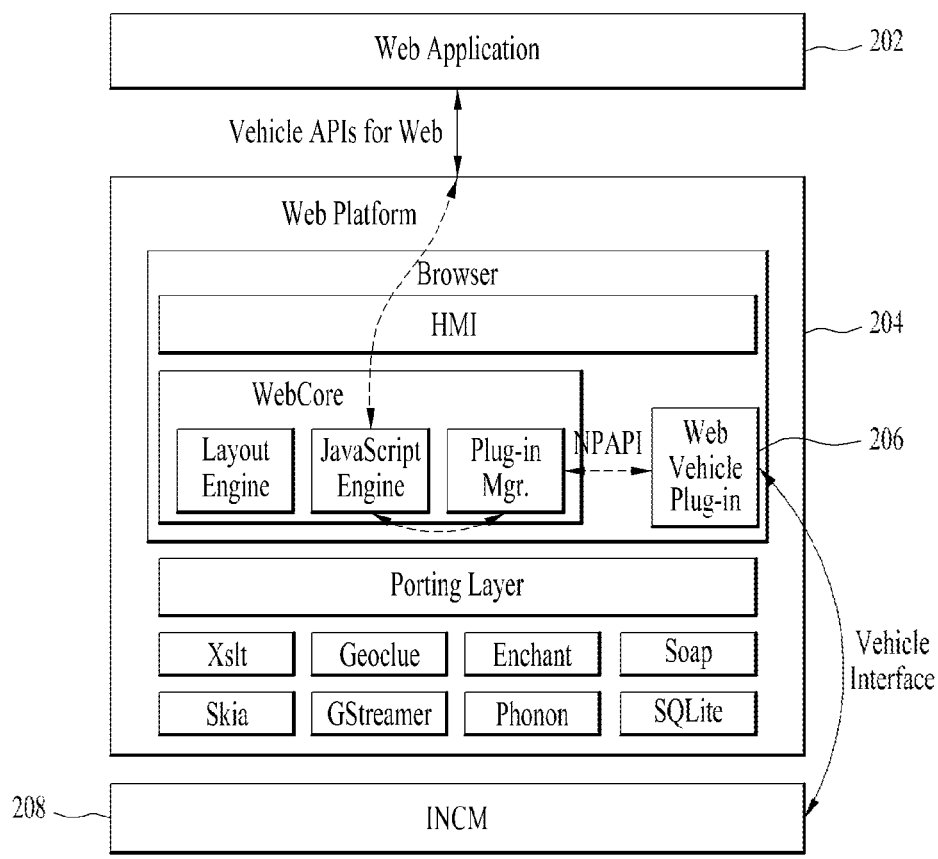
FIG. 3 is a schematic diagram of a web application platform according to an embodiment of the present invention.

The web application platform 204 is used to execute the web application 202, which will be described below with reference to FIG. 3. The web application 202 may be written in Java Script or HyperText Markup Language (HTML) code.

In addition, the execution screen of the web application 202 may be displayed on the display unit 101 mounted in the vehicle. Further, the first processor 200 may receive a user action via the displayed execution screen of the web application 202.

For example, the first processor 200 may receive a user action through buttons for inputting each kind of key signals of the front board 102. As another example, if the display unit 101 is a touchscreen, a user action for selecting an object displayed on the execution screen of the web application 202 may be received.

Further, the first processor 200 may output a vehicle control command to the second processor 210 according to the received user action. In addition, the first processor 200 may output the INC message including the vehicle control command in the CAN interaction region to the second processor 210 through the INC module. The second processor 210 may then output the vehicle control command included in the INC message to the CAN controller 212 to control parts of the vehicle.

Hereinafter, a web application platform 204 used when the first processor 200 executes the web application 202 will be described. In particular, FIG. 3 is a schematic diagram of a web application platform 204 according to an embodiment of the present invention. The web application platform 204 includes a web vehicle plug-in 206. The web vehicle plug-in 206 may provide the web application 202 with a web application programming interface (API) for vehicle data and control command processing.

The web API may be defined as an interface for the web application 202 in the in-vehicle infotainment system 100 for accessing vehicle data received via a vehicle data bus. Further, the web API for vehicle data may be defined in a web interface definition language (IDL).

The web API may restructure and provide the vehicle data received from the second processor 210 to the web application 202 in the web IDL via the web vehicle plug-in 206. In addition, the web API may output a GET command of the web application for requesting vehicle data or a SET command of the web application 202 for controlling a vehicle to the INC module via the web vehicle plug-in.

By the GET command, if the vehicle data is received from the second processor 210, the web application platform 204 may change each value included in the vehicle data to a web IDL. By the SET command, if a vehicle control command is output from the web application, the web application platform 204 may change the vehicle control command to CAN communication language.

The vehicle control command changed to CAN communication language by the web application platform 204 may be output to the second processor 210 via the INC module 208. All interfaces for data exchange may pass to a VehicleEvent interface and may be defined. All vehicle data may be one kind of VehicleEvent and may be accessed as attributes of VehicleEvent. Further, the GET command the SET command may be Java Script objects. This will be described below with reference to FIGS. 5 to 7.

Figure 4:
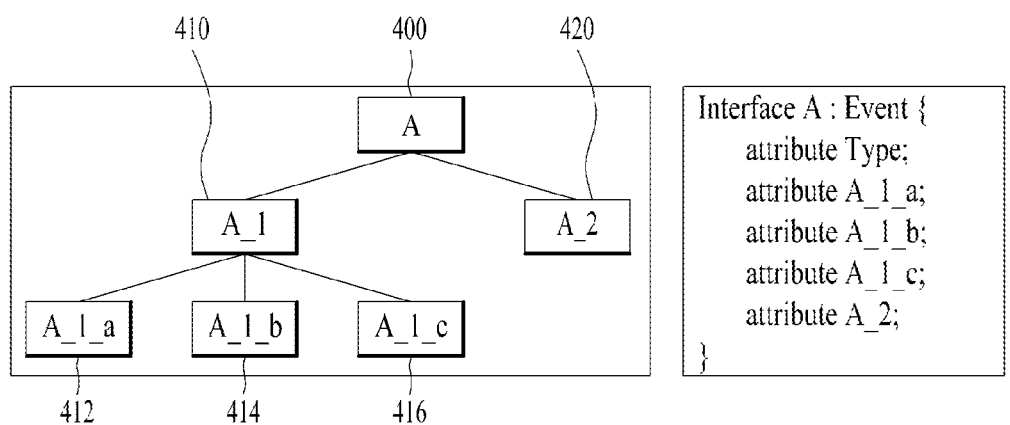
FIG. 4 is a diagram showing a data structure of vehicle data according to an embodiment of the present invention.

Next, a data structure of vehicle data will be described with reference to FIG. 4. In particular, FIG. 4 is a diagram showing a data structure of vehicle data according to an embodiment of the present invention. As shown, the data structure of the vehicle data may be a data tree structure composed of a highest node 400 and lower nodes 410 and 420 commonly including attributes of the higher node.

Further, an internal value of vehicle data changed to the IDL may be located at distal nodes 412, 414, 416 and 420. The higher node 410 having at least one lower node 412, 414 and 416 may be defined as an ID indicating a data group having an internal value of common attributes. In addition, the vehicle data may be located as the internal value of the lower nodes 412, 414 and 416 of any one higher node 410 according to the common attributes of the vehicle data.

All nodes may be defined by a variable Type_ID. The type attributes may be used as an ID for identifying a vehicle data type and a data validity range. For example, with respect to the shown data structure, only an A_1_b node 414 is valid if the attribute type is "A_1_b", only an A_1_a node 412, an A_1_b node 414 and an A_1_c node 414 are valid if the attribute type is "A_1", and an A_1_a node 412, an A_1_b node 414, an A_1_c node 414 and an A_2 node 420 are valid if the attribute type is "A".

Hereinafter, a message for requesting vehicle data and outputting a vehicle control command will be described with reference to FIGS. 5 to 7. In particular, FIG. 5 is a diagram showing an example of a message for requesting vehicle data according to an embodiment of the present invention. In FIG. 5, assume that the requested vehicle data is related to a vehicle transmission gear type.

If only data about a vehicle transmission gear type is requested using the GET command, the vehicle data may be delivered to the web application 202 via a unified object including a vehicle data set. However, only data about a vehicle transmission gear type requested using the GET command in the vehicle data set is valid.

As shown, a vehicle transmission gear type variable may be defined. An automatic transmission gear type variable may be defined as TRANSMISSION_GEAR_TYPE_AUTO=1 and a manual transmission gear type variable may be defined as TRANSMISSION_GEAR_TYPE_MANUAL=2. The web application 202 may request "vehicle_info_transmission_gear_type" from the web vehicle plug-in 206 via the GET command and perform a function according to the vehicle transmission gear type data received by the request.

For example, if the vehicle transmission type data is TRANSMISSION_GEAR_TYPE_AUTO, the web application 202 may output a phase "Automatic transmission equipped" on the display unit 101 as a console.log function. As another example, if the vehicle transmission type data is TRANSMISSION_GEAR_TYPE_MANUAL, the web application 202 may output a phase "Manual transmission equipped" on the display unit 101 as a console.log function.

Next, FIG. 6 is a diagram showing another example of a message for requesting vehicle data according to an embodiment of the present invention. In FIG. 6, assume that vehicle data is related to pressure of a vehicle tire.

If only data about a vehicle tire pressure status is requested using the GET command, the vehicle data may be delivered to the web application 202 as a unified object including a vehicle data set. However, only data about a vehicle tire pressure status requested using the GET command in the vehicle data set is valid.

As shown, a variable according to data about vehicle tire pressure status may be defined. A normal vehicle tire pressure status may be defined as TIRE_PRESSURE_STATUS_NORMAL=1, a low vehicle tire pressure status may be defined as TIRE_PRESSURE_STATUS_LOW=2 and a high vehicle tire pressure status may be defined as TIRE_PRESSURE_STATUS_HIGH=3.

The web application 202 may request "maintenance_tire_pressure_status" from the web vehicle plug-in 206 via the GET command and perform a function according to data about the vehicle tire pressure status by the request. For example, if data about all vehicle tire pressure statuses is not 0, the web application 202 may output a message "Check your tire pressure" on the display unit 101 as a console.log function.

In addition, "maintenance_tire_pressure_status" may be used as an upper level VehicleEventType of "_FRONT_LEFT", "_FRONT_RIGHT", "REAR_LEFT" and "_REAR_RIGHT". Vehicle data requested and received by "maintenance_tire_pressure_status" may include data of "_FRONT_LEFT", "_FRONT_RIGHT", "_REAR_LEFT" and "_REAR_RIGHT". That is, if upper level data is requested by the web application 202, all data values of a level lower than the requested upper level may be output.

Next, FIG. 7 is a diagram showing an example of a message for controlling a vehicle according to an embodiment of the present invention. As the value of each part of a vehicle is set via the SET command, the function of the vehicle may be controlled. In FIG. 7, assume that a value of a vehicle driving mode is set.

First, a driving mode variable may be defined as DRIVING_MODE_COMFORT=1, DRIVING_MODE_AUTO=2, DRIVING_MODE_SPORT=3, DRIVING_MODE_ECO=4 and DRIVING_MODE_MANUAL=5.

If the driving mode value is set to DRIVING_MODE_SPORT, the first processor 200 may output a message for changing the driving mode according to the set value to the second processor 210 via the INC module and the web application 202 may output a message "Setting driving mode command has been successfully sent to the vehicle bus" on the display unit 101 as a console.log function.

Further, the first processor 200 may restrict vehicle function setting via the vehicle data received from the second processor 210. For example, if the vehicle is being driven, the first processor 200 may determine that the vehicle is in a driving mode via the vehicle data received from the second processor 210. Then, even when a SET command for opening a vehicle door is output from the web application 202, the first processor 200 may not output a message for opening the vehicle door to the second processor 210.

Alternatively, if the vehicle is being driven, the first processor 200 may halt execution of the web application 202 for controlling the vehicle door. In another example, if the vehicle is being driven, the first processor 200 may stop the display of the display unit 101 of the web application 202 for controlling the vehicle door.

That is, the first processor 200 may halt execution of web application 202 according to the vehicle status determined as the vehicle data. In addition, the first processor 200 may stop the display of the web application 202 according to the vehicle status determined as the vehicle data. In addition, the first processor 200 may not output the SET command output from the web application 202 to the second processor 210 according to the vehicle status determined as the vehicle data.

In addition, the first processor 200 may restrict the range for setting the vehicle by the web application 202 according to the vehicle status determined as the vehicle data. For example, when the vehicle is being driven, if a SET command for changing the height of a driver's seat by a predetermined range or more is output, the first processor 200 may not output the SET command to the second processor 210. Further, the first processor 200 may output a message "The height of the seat cannot be changed by the predetermined range or more" on the display unit 101.

Alternatively, the first processor 200 may change the execution screen of the web application 202 displayed in order to change the height of the driver's seat if the vehicle is being driven. For example, the first processor may control the web application 202, which is displayed in order to change the height of the driver's seat, to display only a height range of the driver's seat changeable by the user.

FIG. 8 is a diagram showing an example of an EventHandler for monitoring vehicle data according to an embodiment of the present invention. The EventHandler may be used to monitor variation in specific vehicle event data. The EventHandler may use an upper level event type in order to monitor variation in vehicle event data of a vehicle event data group.

The EventHandler may be called whenever vehicle event data of the group is changed. As shown, an event handler "addEventListener" for monitoring variation in "driving_safety_door_open_status" which is vehicle event data indicating the open/close status of the vehicle door is set.

This means an event handler for executing a handleVehicleData function if the current open/close status of the vehicle door is changed. The handleVehicleData function outputs a message indicating the open/closed status of the vehicle door on the display unit 101 according to the value of "driving_safety_door_open_status".

Hereinafter, a method of changing at the first processor 200 a visual element to correspond to a characteristic value determined through vehicle data, which is received from the second processor 210 and includes a characteristic value of a vehicle, will be described with reference to FIG. 9.

Figure 9:
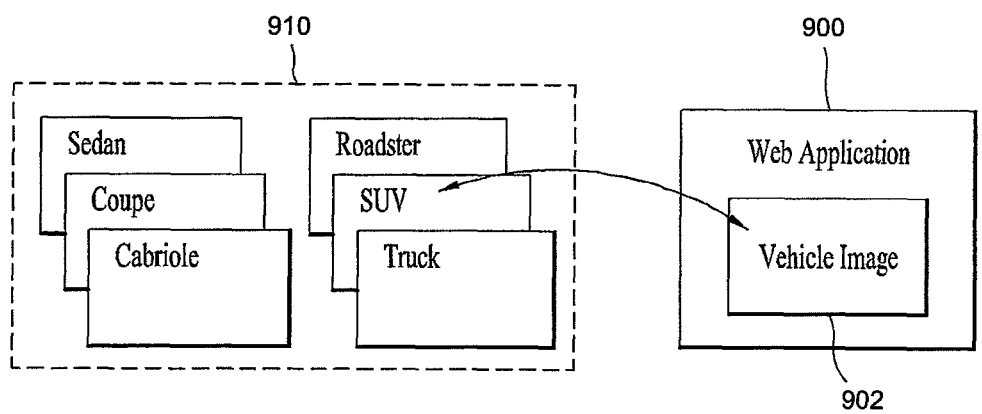
FIG. 9 is a diagram showing an example of changing a visual element of a web application through vehicle data according to an embodiment of the present invention.

In particular, FIG. 9 is a diagram showing an example of changing a first visual element 910 of a web application 900 displayed on the external image device or display unit 101 through vehicle data according to an embodiment of the present invention. First, the web application 900 may define a first variable 902 for a vehicle type.

Hereinafter, assume that the first variable 902 has a vehicle type as a visual element. The first processor 200 may change and display a first visual element 910 according to a value set as the first variable 902 on the external image device 101 via the web application 900.

That is, the first variable 902 corresponds to the first visual element 910 indicating the vehicle type, and the vehicle type displayed as the first visual element 910 may be changed if the characteristic value set as the first variable 902 is changed.

In more detail, if vehicle data is received from the second processor 210, the first processor 200 may determine whether the characteristic value to be set as the first variable 902 is present in the vehicle data and set the determined characteristic value as the first variable 902 if the characteristic value is present.

Then, the first processor 200 may display a vehicle type image corresponding to the characteristic value via the web application 900. As shown, if the characteristic value corresponding to SUV is set as the variable corresponding to the vehicle type, the first processor 200 may display an image of SUV on the external display device 101 via the web application 900.

If the characteristic value set as the first variable 902 is not determined through the vehicle data, the first processor 200 may determine the characteristic value set as a second variable related to the first variable 902. For example, if the characteristic value related to a vehicle type is not present in the vehicle data, the first processor 200 may determine whether a characteristic value related to a vehicle door is present in order to estimate a vehicle type.

In addition, if the second characteristic value is not determined through the vehicle data, the first processor 200 may change the first visual element to a default visual element and output an image including the changed first visual element on the external image device 101.

A method of outputting a vehicle type image related to the first characteristic value and the second characteristic value will be described below with reference to FIG. 10.

If an external device is mounted in a vehicle, vehicle data may further include a third characteristic value related to the external device mounted in the vehicle. The first processor 200 may generate a third variable for setting the third characteristic value and receive a third visual element related to the third variable from the external device.

In addition, the received third visual element may be stored in a memory 113. Alternatively, the first processor 200 may replace the third visual element with a visual element pre-stored in an external server or the memory 113.

For example, the first processor 200 may output an image indicating the inside of the vehicle on the external image device 101 via the web application 900. Further, if a mobile terminal is mounted in the vehicle, the first processor 200 may generate the third variable such that the type of the mobile terminal is displayed within the image indicating the inside of the vehicle.

The first processor 200 may receive the image indicating the type of the mobile terminal from the mobile terminal. Then, if the mobile terminal is mounted, the first processor 200 may determine the third characteristic value through the vehicle data received from the second processor and set the third characteristic value as the third variable.

The first processor 200 may change the third visual element according to the characteristic value set as the third variable and output an image including the changed third visual element on the external image device 101.

Hereinafter, a method of changing and outputting a vehicle type image according to a first characteristic value and a second characteristic value will be described with reference to FIG. 10. In particular, FIG. 10 is a diagram showing an example of application code for changing a visual element of a web application 900 according to an embodiment of the present invention. For example, assume that a first variable related to a vehicle type is vehicletype and a second variable related to a vehicle door is doortype.

If it is determined that a first characteristic value set as vehicletype is not present through vehicle data received from the second processor 210, the first processor 200 may determine whether a second characteristic value set as doortype is present, in order to estimate a vehicle type. If it is determined that a second characteristic value set as doortype is not present through the vehicle data received from the second processor 210, the first processor 200 may output a default vehicle image.

Further, if the second characteristic value is present, the first processor 200 may estimate the vehicle type according to the second characteristic value. For example, if it is determined that a rear door of a vehicle is not present through the second characteristic value, the first processor 200 may further determine whether a characteristic value set as convertible_roof is set as vehicle data.

That is, the first processor 200 may determine the vehicle type, which is a first visual element, through information about the vehicle door. The first processor 200 may determine that the vehicle type is cabriolet or roadster according to the characteristic value set as convertible_roof. Alternatively, if it is determined that the rear door of the vehicle is present through the second characteristic value, the first processor 200 may determine that the vehicle type is sedan.

The first processor 200 may output an image according to the determined vehicle type on the external image device 101. If the first characteristic value is present, the first processor 200 may output an image corresponding to the vehicle type on the external image device 101. The method described above is depicted in the flowchart of FIG. 11, having steps S1110-S1180.

The in-vehicle infotainment device according to the present invention has the following advantages.

According to at least one of the embodiments of the present invention, it is possible to easily display a vehicle status through a web application in the in-vehicle infotainment device. Further, it is possible to efficiently process vehicle status information in a web application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling an infotainment device mounted in a vehicle, the method comprising:
   executing, via a processor of the infotainment device, a web application on the infotainment device;
   displaying, via a display unit of the infotainment device, a web browser page corresponding to the executing web application;
   receiving, via the processor, vehicle data of the vehicle from a vehicle processor that is external to the infotainment device;
   structuring the vehicle data as a data tree structure;
   determining, via the processor, if a first vehicle characteristic value corresponding to a first image of the vehicle to be displayed on the display unit of the infotainment device is included in the structured vehicle data;
   displaying the first image of the vehicle on the web browser page if the first vehicle characteristic value is included in the vehicle data;
   determining, via the processor, if a second vehicle characteristic value of the vehicle is included in the vehicle data when the first vehicle characteristic value is not included in the vehicle data;
   estimating, via the processor, the first vehicle characteristic value of the vehicle using the second vehicle characteristic value if the first vehicle characteristic value is not included and the second vehicle characteristic value is included in the vehicle data;
   displaying a second image of the vehicle on the web browser page corresponding to the estimated first vehicle characteristic value;
   estimating, via the processor, the first vehicle characteristic value of the vehicle based on the second vehicle characteristic value;
   setting the second vehicle characteristic value as a first level node based on the vehicle data and the data tree structure;
   setting whether a rear door exists as a second level node based on the vehicle data and the data tree structure;
   setting whether a convertible roof exists as a third level node based on the vehicle data and the data tree structure;
   determining, via the processor, whether vehicle data includes a convertible roof if it is determined that the rear door is not existent in the vehicle based the first level node and the second level node;
   determining, via the processor, the vehicle type is a cabriolet if the vehicle data includes a convertible roof based on the first level node, the second level node and the third level node;
   determining, via the processor, the vehicle type is a roadster if the vehicle data does not include a convertible roof based on the first level node, the second level node and the third level node;

determining, via the processor, the vehicle type is a sedan if it is determined that the rear door is existent in the vehicle based on the first level node and the second level node;

displaying an image corresponding to the determined vehicle type on the web browser page;

receiving, via the processor, a first selection on the displayed web browser page for setting a driving mode of the vehicle;

generating, via the executing web application, a set command for setting the driving mode of the vehicle based on the received first selection;

converting, via the processor, the set command to a format used by the vehicle processor and transferring the converted set command to the vehicle processor;

receiving, from the vehicle processor, a return message indicating the driving mode has successfully been set for the vehicle; and displaying a message on the web browser page indicating the driving mode has been successfully set for the vehicle, wherein the first vehicle characteristic value identifies a vehicle type of the vehicle, wherein the second vehicle characteristic value includes vehicle door values corresponding to doors included in the vehicle, wherein the vehicle door values include at least one of a number and arrangement of doors in the vehicle, wherein the second level node includes the attributes of the first level node, and wherein the third level node includes the attributes of the first level node and the second level node.

2. The method of claim 1, further comprising:
displaying a default image on the display unit if the first and second vehicle characteristic values are not included in the vehicle data.

3. The method of claim 1, further comprising:
receiving, via the processor, a second selection on the displayed web browser page for setting an additional mode of the vehicle;

determining, via the processor, if the additional mode conflicts with the set driving mode; and restricting, via the processor, the additional mode from being performed on the vehicle if the additional mode conflicts with the set driving mode.

4. The method of claim 3, wherein the additional mode includes one of opening a door, moving a seat and displaying of the web browser page.

5. The method of claim 1, wherein the processor of the infotainment device communicates with the executing web application using a first communication mode, and the vehicle processor of the vehicle communicates with components of the vehicle using a second communication mode, and wherein the processor of the infotainment device and the vehicle processor of the vehicle include Inter-Node Communication (INC) interface modules for converting the first and second communication modes to INC modes.

6. An infotainment device, comprising:
a display unit; and
a processor configured to:
execute a web application on the infotainment device and display a web browser page corresponding to the executing web application;
receive vehicle data of the vehicle from a vehicle processor that is external to the infotainment device;
structure the vehicle data as a data tree structure;
determine if a first vehicle characteristic value corresponding to a first image of the vehicle to be displayed on the display unit of the infotainment device is included in the structured vehicle data;
display the first image of the vehicle on the web browser page if the first vehicle characteristic value is included in the vehicle data;
determine if a second vehicle characteristic value of the vehicle is included in the vehicle data when the first vehicle characteristic value is not included in the vehicle data;
estimate the first vehicle characteristic value of the vehicle using the second vehicle characteristic value if the first vehicle characteristic value is not included and the second vehicle characteristic value is included in the vehicle data;
display a second image of the vehicle on the web browser page corresponding to the estimated first vehicle characteristic value;
estimate the first vehicle characteristic value of the vehicle based on the second vehicle characteristic value;
set the second vehicle characteristic value as a first level node based on the vehicle data and the data tree structure;
set whether a rear door exists as a second level node based on the vehicle data and the data tree structure;
set whether a convertible roof exists as a third level node based on the vehicle data and the data tree structure;
determine whether vehicle data includes a convertible roof if it is determined that the rear door is not existent in the vehicle based on the first level node and the second level node;
determine the vehicle type is a cabriolet if the vehicle data includes a convertible roof based on the first level node, the second level node, and the third level node;
determine the vehicle type is a roadster if the vehicle data does not include a convertible roof based on the first level node, the second level node, and the third level node;
determine the vehicle type is a sedan if it is determined that a rear door the rear door is existent in the vehicle based on the first level node and the second level node;
display an image corresponding to the determined vehicle type on the web browser page;
receive a first selection on the displayed web browser page for setting a driving mode of the vehicle;
generate, via the executing web application, a set command for setting the driving mode of the vehicle based on the received first selection;
convert the set command to a format used by the vehicle processor and transferring the converted set command to the vehicle processor;
receive, from the vehicle processor, a return message indicating the driving mode has successfully been set for the vehicle; and
display a message on the web browser page indicating the driving mode has been successfully set for the vehicle;
wherein the first vehicle characteristic value identifies a vehicle type of the vehicle,
wherein the second vehicle characteristic value includes vehicle door values corresponding to doors included in the vehicle,
wherein the vehicle door values include at least one of a number and arrangement of doors in the vehicle, wherein the second level node includes the attributes of the first level node, and wherein the third level node includes the attributes of the first level node and the second level node.

7. The infotainment device of claim 6, wherein the processor is further configured to display a default image on the display unit if the first and second vehicle characteristic values are not included in the vehicle data.

8. The infotainment device of claim 6, wherein the processor is further configured to:

receive a second selection on the displayed web browser page for setting an additional mode of the vehicle;

determine if the additional mode conflicts with the set driving mode; and restrict the additional mode from being performed on the vehicle if the additional mode conflicts with the set driving mode.

9. The infotainment device of claim 8, wherein the additional mode includes one of opening a door, moving a seat and displaying of the web browser page.

10. The infotainment device of claim 6, wherein the processor of the infotainment device communicates with the executing web application using a first communication mode, and the vehicle processor of the vehicle communicates with components of the vehicle using a second communication mode, and wherein the processor of the infotainment device and the vehicle processor of the vehicle include Inter-Node Communication (INC) interface modules for converting the first and second communication modes to INC modes.

* * * * *